United States Patent [19]

Gerrath et al.

[11] Patent Number: 4,811,238
[45] Date of Patent: Mar. 7, 1989

[54] TORQUE MEASUREMENT SYSTEM

[75] Inventors: Karl-Heinz Gerrath; Eberhard Strauss, both of Griesheim; Hans-Joachim Decker, Wiesbaden; Heinz Vinson, Langen, all of Fed. Rep. of Germany

[73] Assignee: Battelle-Institut E.V., Frankfurt am Main, Fed. Rep. of Germany

[21] Appl. No.: 857,754

[22] PCT Filed: Oct. 3, 1985

[86] PCT No.: PCT/EP85/00516
 § 371 Date: Mar. 26, 1986
 § 102(e) Date: Mar. 26, 1986

[87] PCT Pub. No.: WO86/03294
 PCT Pub. Date: Jun. 5, 1986

[30] Foreign Application Priority Data

Nov. 22, 1984 [DE] Fed. Rep. of Germany ....... 3442459
Mar. 19, 1985 [DE] Fed. Rep. of Germany ....... 3509763

[51] Int. Cl.$^4$ .................. G01M 7/00; G06F 15/00
[52] U.S. Cl. .................. 364/508; 364/511; 364/551.01; 73/862.36
[58] Field of Search ............ 364/506, 508, 551, 552, 364/511; 73/862.36, 862.17, 862.08, 1 C, DIG. 2, 165, 660; 324/209; 74/866

[56] References Cited

U.S. PATENT DOCUMENTS

| | | | |
|---|---|---|---|
| 3,870,226 | 3/1975 | LeRoy | 364/511 |
| 4,166,437 | 9/1979 | Bianchi et al. | 123/486 |
| 4,195,345 | 3/1980 | Artzt et al. | 364/552 |
| 4,352,292 | 10/1982 | Madigosky et al. | 73/575 |
| 4,467,662 | 8/1984 | Valdermasson | 73/DIG. 2 |
| 4,609,992 | 9/1986 | Bray | 364/550 |

FOREIGN PATENT DOCUMENTS

1183276 12/1964 Fed. Rep. of Germany.

Primary Examiner—Parshotam S. Lall
Assistant Examiner—Ellis B. Ramirez
Attorney, Agent, or Firm—Fisher, Christen & Sabol

[57] ABSTRACT

In a system for measuring torque, torsional vibrations and power, emitters and sensors are arranged on at least one rotating shaft. From one of the frequencies ($f_1$ or $f_2$) of the signals ($S_1$ or $S_2$) of the sensors, a new signal ($S_3$) is generated whose frequency ($f_3$) corresponds to the sum or difference frequency of the frequencies ($f_1$, $f_2$), and which is phase-locked to the signal ($S_1$ or $S_2$) from which it is generated. The relation of the initial phase of the new signal ($S_3$) with the frequency-generating signal ($S_1$ or $S_2$) is determined also by the other signal ($S_2$ or $S_1$). The signals ($S_1$, $S_2$) and the new signal ($S_3$) are fed to a multiplier. The measure of the torsion-dependent twist of the emitters with respect to each other, from which the torsional vibration signal can be derived, is determined by integration of the signal ($S_1 \cdot S_2 \cdot S_3$) supplied by the multiplier over one or several of the least common periods of the frequencies ($f_1$, $f_2$, $f_3$) or by appropriate filtering.

16 Claims, 12 Drawing Sheets

TORQUE MEASURMENT SYSTEM

DESCRIPTION

The invention relates to a system for measuring torque, torsional vibrations and power on at leat one rotating shaft, with emitters and sensors as well as a multiplier and a signal processor.

In conventional torque measurement systems, strain gages attached to a shaft are used. The essential drawbacks of such systems consist in the current supply to the measuring bridge, in coupling the signal out from the rotating shaft, and in the elaborateness of the electronic equipment required.

Recent developments are based on contactless processes. In this case, for example, magnetic gear wheels or rings of non-magnetic material, into which permanent magnets have been incorporated, are attached to a drive shaft at a predetermined axial spacing. Each of the magnetic transducers generates pulses at a frequency proportional to the speed of the shaft. In this way the torque of the shaft is determined from the time difference between pulses of the respective transducers. According to a known method, for example, the sensor signals have an initial phase-shift with respect to each other. The pulse trains thus obtained are used to derive the pulse trains for the torque by AND operation (DE-AS 1 183 276). Torquemeters of this type have the essential drawback that the results of the measurements are dependent on environmental factors such as temperature. The measured result is also affected by equipment component and voltage variations. In addition, the measurements may be adversely affected by any type of manufacturing tolerance. An additional drawback is that gear wheels, rings, etc., have to be provided for deriving signals from the shaft, which often implies undesirable manipulations on the shaft, the torque of which is to be measured contactless. Furthermore, these systems are suitable for torque measurement only if the two emitters show the same number of marks and are mounted on one single shaft. Besides, the known systems for signal evaluation do not permit exact determination of torsional vibrations.

The object of the present invention is to provide a system for the measurement of torque as well as the exact determination of torsional vibrations and the simple determination of power. The contactless measurement system should be insensitive to disturbances, thus avoiding the environment- and material-dependent effects on the result. In addition, it should be possible to use as emitters suitably marked or structured wheels, disks or the like that are already available on the shaft and may have different numbers of marks on the periphery, said wheels, disks or the like being not necessarily arranged on one single shaft, but possibly on different shaft of a system of positive-locking shafts.

According to the present invention, a frequency converter is provided by means of which a new signal ($S_3$) can be generated from one of the frequencies ($f_1$ or $f_2$) of the signals ($S_1$, $S_2$) of the sensors, the frequency ($f_3$) of said new signal ($S_3$) corresponding to the sum or difference frequency of the frequencies ($f_1$, $f_2$) of the signals ($S_1$, $S_2$) of the sensors, and said new signal being phase-locked to the signal ($S_1$ or $S_2$) from which it is generated, the relation of the initial phase of said new signal ($S_3$) to the frequency-generating signal ($S_1$ or $S_2$) of the sensors being also determined by the other signal ($S_2$ or $S_1$), and the signals ($S_1$, $S_2$) of the sensors and the signal ($S_3$) of the frequency converter are fed to the multiplier. Advantageous embodiments of the system according to the invention are described in subclaims 2 to 15.

According to the invention, the sensor signals $S_1$ and $S_2$ can be obtained by using two emitters attached to one or several shafts, and relevant sensors fixed close to the emitters. It is possible to use as emitters rings in a known manner, which consist of nonmagnetic material into which permanent magnets of alternating direction of magnetization have been incorporated on the ring periphery. Gear wheels of soft magnetic material are also suitable. The system according to the invention enables to derive signals from the rotation of one or several shafts, without requiring such emitters to be mounted. Thus, it is possible to use any gear wheels, rings, perforated disks, holes or other marks and the like which are already available on the shaft. The numbers of marks provided on the periphery of the emitters, i.e. on wheels, rings, etc., do not necessarily have to be equal. The emitters available on the shaft, which are used for torque measurement, need not be all of the same type, either. The sensors are selected in the known manner according to the type of emitter, and oriented relative to the emitters. If gear wheels or magnetically marked rings are used, it is possible, for example, to use Hall-effect devices or magnetoresistor differential sensors. If optical signals are generated, photoelectric barriers or the like are used.

Each sensor supplies at its signal output a voltage whose shape is determined by the influence of the emitter on the sensor. The alternating sensor signals derived from the rotation of the shaft are converted in a known manner into pulse trains using amplifiers and pulse shapers. According to the invention, a new signal $S_3$ is then generated from the two pulse signals $S_1$ or $S_2$; the frequency $f_3$ of this new signal corresponds to the sum or difference frequency of the frequencies $f_1$ and $f_2$ of the two sensor signals. In addition, as is outlined below, the signals $S_1$, $S_2$ and $S_3$ are brought into a specific phase relation with respect to each other. To this end, it is possible, for example, to use a directly dividing frequency divider or a frequency divider with phase-locked loop.

Subsequently, the new signal $S_3$ is multiplied by the sensor signals $S_1$ and $S_2$. The measure of the torsion-dependent twist of the emitters with respect to each other, from which the torsional vibration signal can be derived, is determined by integration of the signal $S_1.S_2.S_3$ supplied by the multiplier over one or several of the least common periods of the frequencies $f_1$, $f_2$ and $f_3$ or by appropriate filtering. For filtering, preferably a digital filter is proposed, which has been specially adapted to the signal $S_1.S_2.S_3$ supplied by the multiplier. The result can also be obtained by spectral analysis of the signal $S_1.S_2.S_3$.

The power can be determined in a known manner by multiplying the torque by the angular velocity of the respective shaft. The system according to the invention also permits the power to be determined by addition of the torque values obtained within a specific unit time.

The signal processing according to the invention permits disturbing effects and environmental impacts to be eliminated. In particular, d.c. voltage drifts and group delay distortions of sensors and amplifiers are suppressed. Furthermore, it is no longer necessary to mount additional emitters on the shaft to be measured, if marks acting as emitters, such as gear wheels, disks and the like, are available.

Further features, details and advantages of the invention result from the following description and from the schematic drawings.

FIGS. 7(a) and (b) show a possible circuit configuration according to the invention;

FIGS. 9(a) and (b) show the circuitry implementation of the frequency converter;

Figure 1:
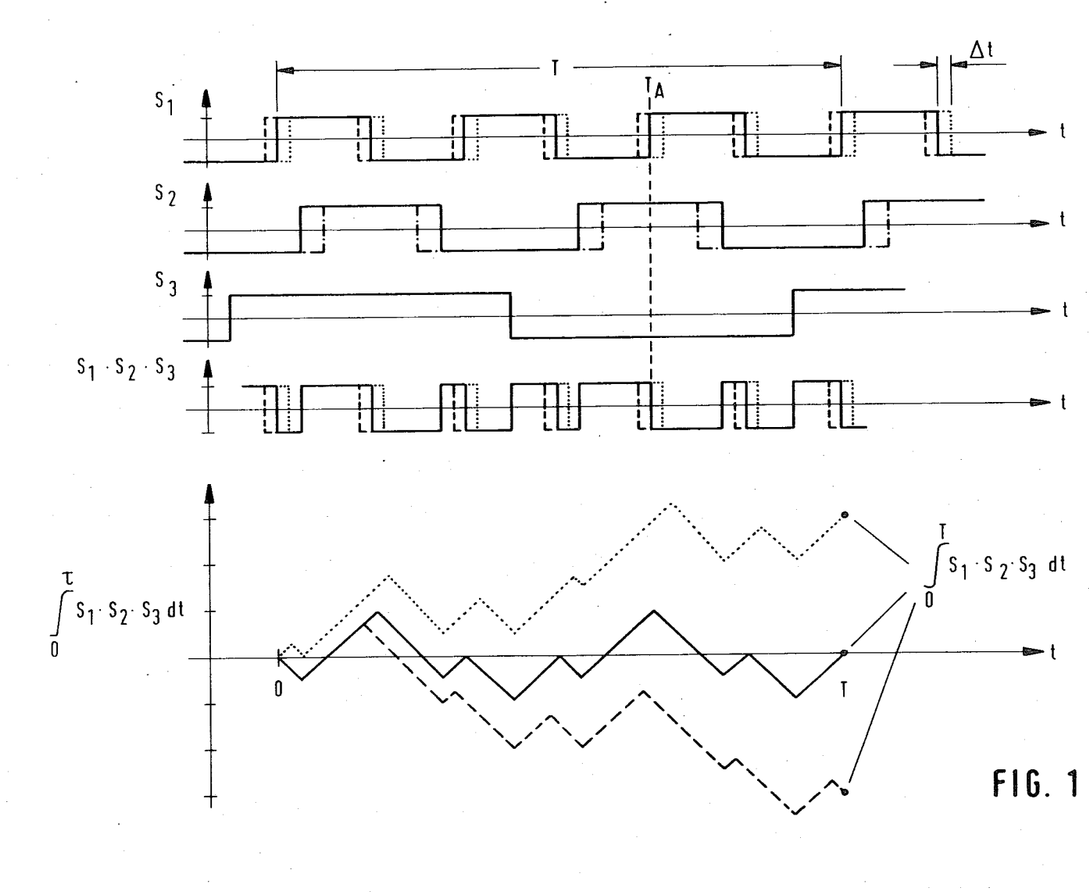
FIG. 1 shows a particularly advantageous example of the signal shapes according to the present invention and the signal evaluation for the determination of torque.
Figure 4:
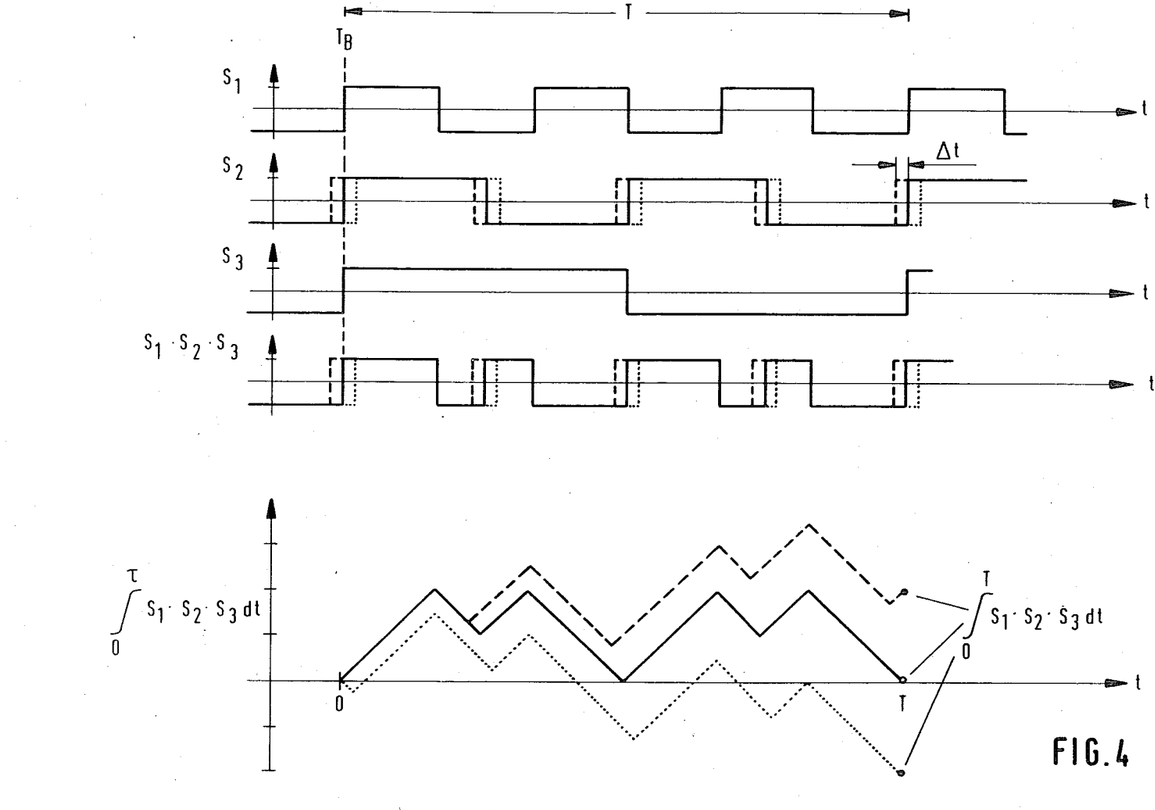
FIG. 4 shows a further example of signal shapes and signal evaluation.

In the case of the examples according to FIG. 1 and FIG. 4, it is assumed that the frequency $f_2$ of the sensor signal $S_2$ is smaller than or, at the most, equal to the frequency $f_1$ of the other sensor signal $S_1$. The frequencies $f_1$ or $f_2$ of the sensor signals $S_1$ and $S_2$ may be even-numbered or uneven-numbered multiples of the fundamental frequency $f_o$. The fundamental frequency $f_o$ is determined from the reciprocal of the least common period T of the sensor signals $S_1$ and $S_2$. According to FIG. 1, a zero-axis crossing of the pulse train of the signal $S_1$ in no-load condition of the shaft or shafts coincides essentially with the pulse center of the other signal $S_2$ at a specific point of time $T_A$ at least once within the least common period T. The zero-axis crossing in this case is that of the pulse train $S_1$ which shows the odd-numbered frequency $f_1$. From the pulse train $S_2$ the pulse train $S_3$ is generated, whose frequency $f_3$ corresponds to the sum or difference frequency of the two frequencies $f_1$ and $f_2$. In the case under consideration, the difference frequency $f_1-f_2$ is formed.

In this example, the signal $S_3$ is phase-locked to the signal $S_2$ irrespective of the twist of the shaft or shafts. For maximum sensitivity, the pulse center of this new pulse train $S_3$ must coincide with the time $T_A$ at least once during one period T. A new pulse train $S_1.S_2.S_3$ is formed by multiplication from the pulse trains $S_1$, $S_2$ and $S_3$.

According to one embodiment of the invention the resulting signal $S_1.S_2.S_3$ is integrated over the time T or over a multiple of T and, for no-load condition results in a signal which is represented by the solid line in FIG. 1, below.

According to another embodiment, the resulting signal $S_1.S_2.S_3$ can be processed in a digital filter specially adapted to this signal in such a way that after each time T a value proportional to torque is obtained.

In the case of a torsion-dependent twist of the shaft, a time delay $\Delta T$ of the pulse trains $S_1$ and $S_2$ with respect to each other occurs, which is presented in FIG. 1 as dotted or dash lines for the pulse train $S_1$. This time delay leads to a change in the resulting pulse train $S_1.S_2.S_3$. Integration over the period T or over a multiple of the T yields the dotted line or the dash line according to FIG. 1, below. After the time T, an output value is thus obtained whose quantity is proportional to the torsion-deendent twist of the shaft or shafts. Similarly, filtering results in an output value after each time T.

Figure 2:
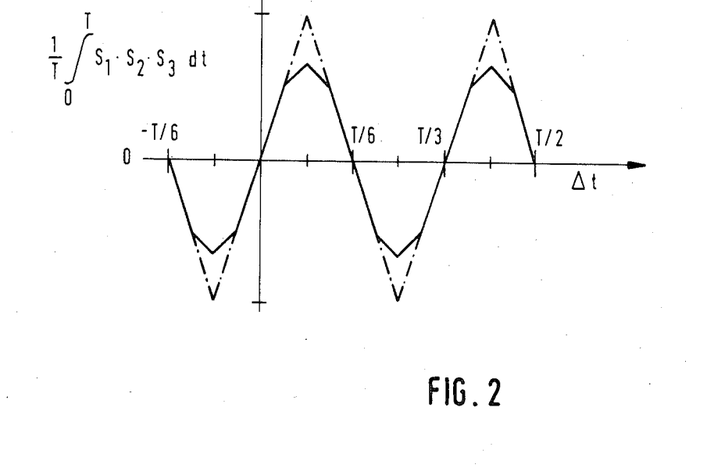
FIG. 2 shows the dependence of the resulting signal on a twist of the emitters with respect to each other by the example of FIG. 1.

The relation between the output value and the torsion-dependent twist of the shaft or shafts is presented in FIG. 2. For specific sections of the time period T, a linear relation results between the output value and the twist. After respective calibration within these time sections, a linear relation can be established between the output value and torque, the torsional rigidity of the shaft and the total number of emitter marks being used for calibration in a conventional manner. Upon variation of the duty cycle in the pulse train $S_2$ according to the dot-dash line in FIG. 1, an optimum twist range is achieved, which can also be seen from the dot-dash line of FIG. 2.

A uniquely defined torque signal for the case presented in FIG. 2 exists only in the range of $\pm T/12$. If the twist at the maximum measurable torque exceeds this unambiguity range the time period T and thus the unambiguity range can be extended by dividing the input frequencies $f_1$ and $f_2$.

Figure 3:
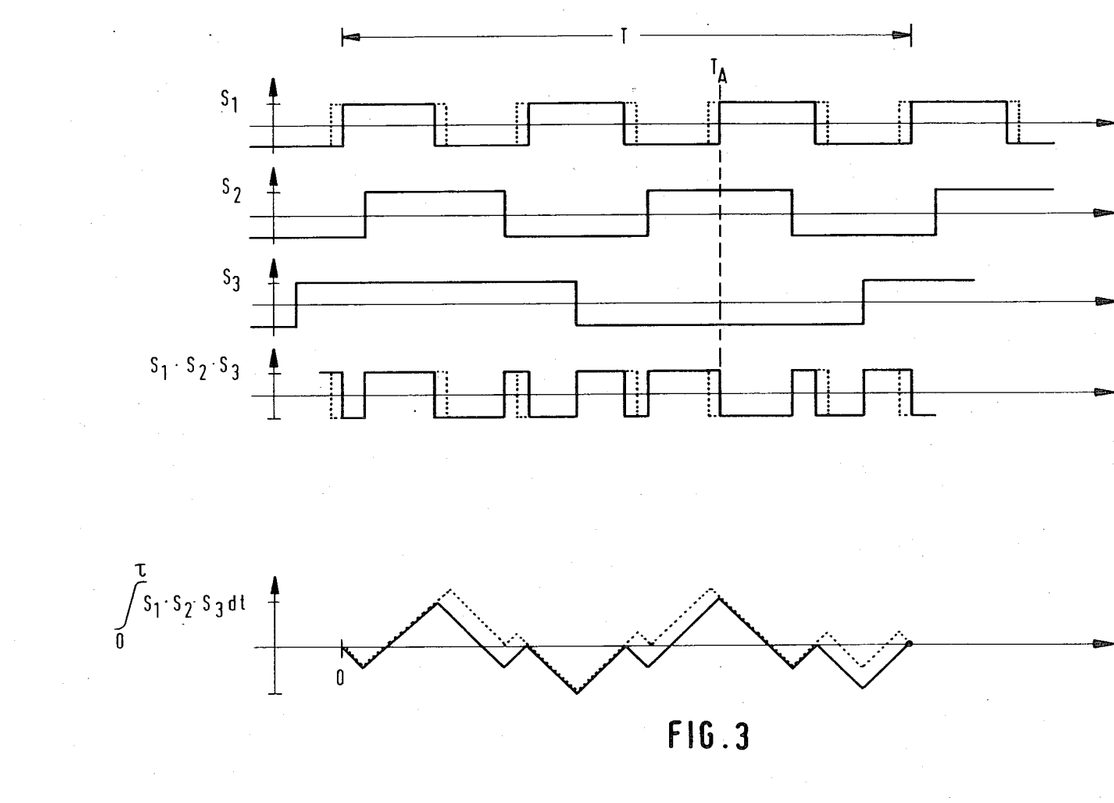
FIG. 3 represents the compensation of disturbing effects in the case of a signal shape according to FIG. 1.

A voltage offset in a sensor or a shift of the threshold of the amplifiers, for example, causes a change of the signal shape, as is shown in FIG. 3 for signal $S_1$ by the dotted line. Such a disturbance results in a change of the signal $S_1.S_2.S_3$, but, due to the signal evaluation according to the invention, does not affect the output value, which is proportional to torque.

The explanation given for FIG. 1 applies essentially also to the example shown in FIG. 4. The signal shapes $S_1$ and $S_2$ of FIG. 4 differ from those of FIG. 1 in so far as, in no-load condition the zero-axis crossing of signal $S_1$ coincides at the time $T_B$ approximately with the zero-axis crossing of the other signal $S_2$. In this case the zero-axis crossing of signal $S_3$ is related to the zero-axis crossing of the signal $S_1$ at the time $T_B$. The occurrence of torque is presented in the signal curves also by dotted or dash lines.

Figure 5:
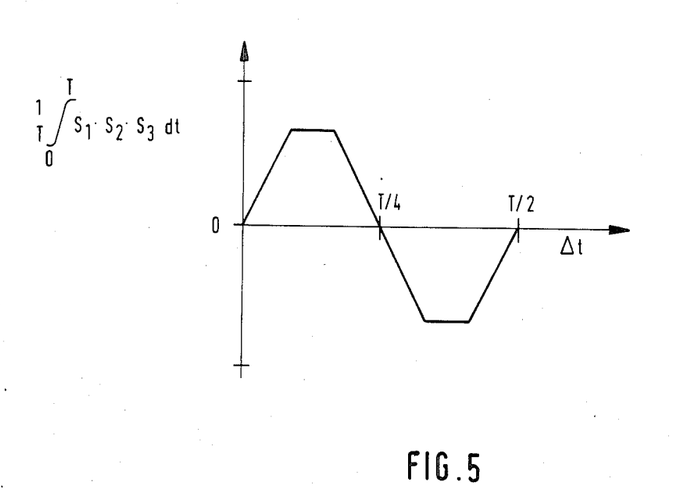
FIG. 5 shows the dependence of the resulting signal on the twist of the emitters with respect to each other by the example of FIG. 4.
Figure 6:
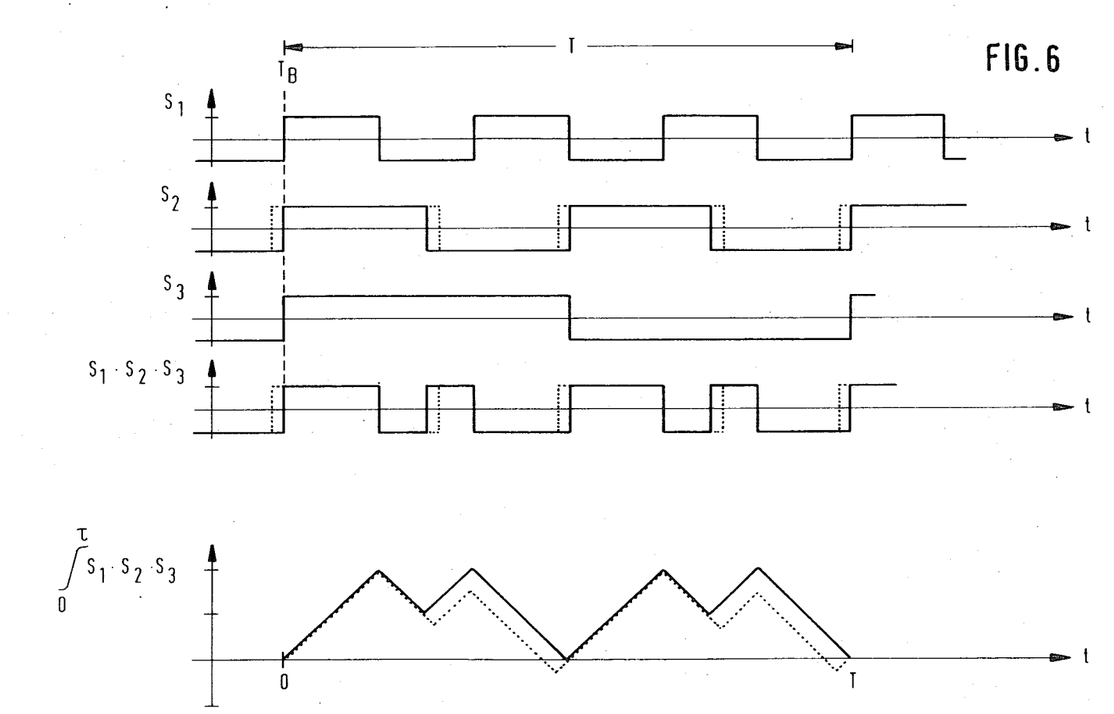
FIG. 6 shows the compensation of disturbing effects for a signal shape according to FIG. 4.

According to FIG. 5, a linear relation exists also between the resulting value of integration and torque. FIG. 6 also shows that the resulting value is not affected in case of a disturbance, e.g., by a voltage offset.

It is essential for the system according to the invention that the frequency $f_3$ of the signal $S_3$ is generated either from the frequency $f_2$ of the signal $S_2$, as in FIG. 1, or from the frequency $f_1$ of the signal $S_1$, as in FIG. 4. As a result, the signal $S_3$ is phase-locked with the signal from which it is generated. The frequency converter has the function to carry out this process, either by frequency division or by a combination of frequency multiplication with subsequent division. It is thus possible to generate numerous signals $S_3$ which all have the same frequency $f_3$ but differ in their respective phase positions. The selection criterion for the phase position of signal $S_3$ which is to be used for further processing then consists in the required or otherwise determined relation of the sensor signal, from which the signal $S_3$ is generated, with the other sensor signal.

Figure 7:
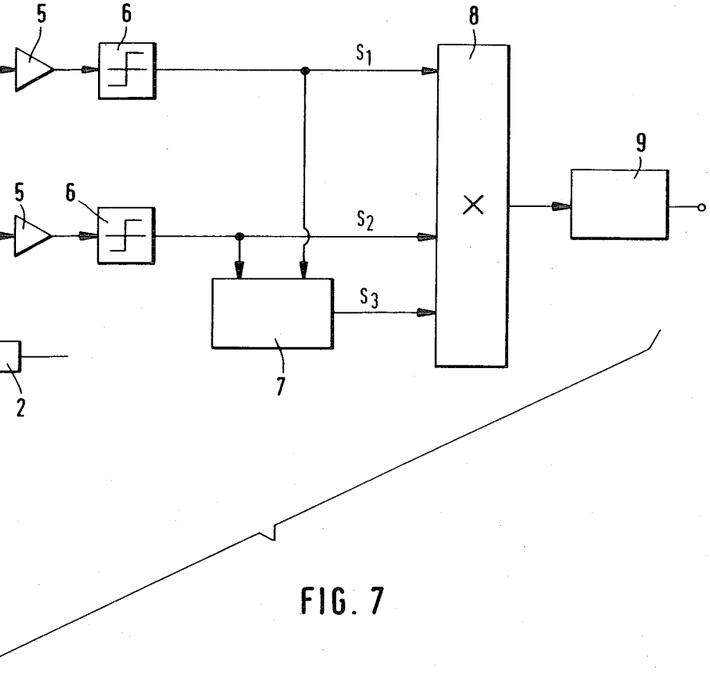
Figures 7A, 7B:
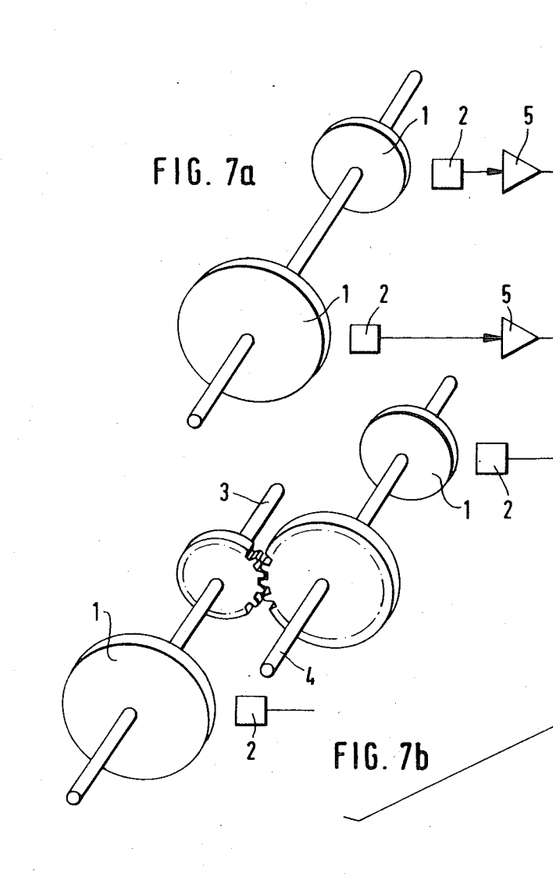

FIG. 7(a) shows a possible curcuitry configuration according to the invention. Sensors 2 are arranged close to the emitters 1, which in this case have different numbers of marks and differ in size.

As results from FIG. 7(b), systems of positive locking shafts, which may occur, for example, in gear boxes, are provided with a minimum of one emitter 1 at each of the shafts 3 and 4. As described above, the emitters 1 may be, for example, gear wheels that are already mounted on the shaft.

The output voltages of the sensors 2 are fed to an amplifier 5 and then to a pulse shaper 6 according to the signals $S_1$ and $S_2$ with frequencies $f_1$ and $f_2$. If necessary, a delay equalizer may be connected at the output of one of the amplifiers 5, in order to equalize differences in the signal delays from the emitter 1 to the multiplier 8 between the two signal paths. This will be necessary in the case of both unequal behavior with respect to the frequency response of the sensors 2, the amplifiers 5 and the pulse shapers 6, as well as in the case of differences in the influence of hysteresis effects in the case of the emitter 1 or the sensor 2 or in the case of asymmetric changeover behavior of the multiplier 8.

If both directions of rotation are to be evaluated, it is necessary, in the case of both the influence of hysteresis and of asymmetric changeover behavior of the multiplier 8, to provide separate delay equalizers for each direction of rotation, in order to achieve a symmetric torque indication.

It is also possible to connect one frequency divider at the output of each of the pulse shapers 6, in order to simplify the measurement of the twisting angle, as outlined before, e.g. by achieving more favorable frequency conditions, and to enable the utilization of a larger twisting angle of the shaft or the shafts for the measurement.

A frequency converter 7 is connected at the output of each of the pulse shapers 6, which may be a direct frequency divider or a frequency divider with a phase-locked loop. It is essential that a signal $S_3$ is obtained whose frequency $f_3$ corresponds either to the difference frequency $f_1-f_2$ or to the sum frequency $f_1+f_2$ and fulfills the above conditions.

The signal $S_3$ is then multiplied by the sensor signals $S_1$ and $S_2$ in a multiplier 8. In this case it is irrelevant which of the three signals are the first to be multiplied by each other. At the output of the multiplier 8, an integrator 9 is provided, which integrates the pulse trains $S_1$, $S_2$ and $S_3$ over one or several of the least common periods T, or a digital filter.

Figure 8:
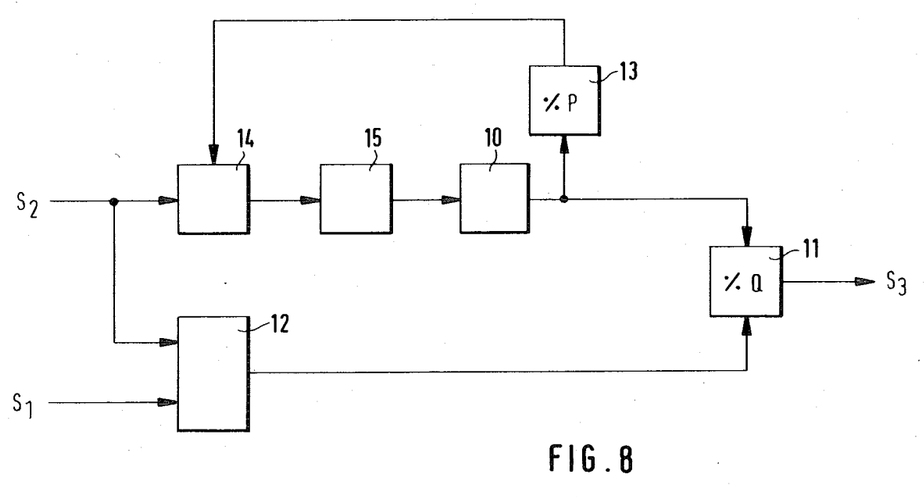
FIG. 8 is the basic circuit diagram of a possible embodiment of the frequency converter.

According to FIG. 8, a clock generator 10 at the frequency $P \cdot f_2$ or $P \cdot f_1$ is provided in the frequency converter 7 according to FIG. 7, which is synchronized via a phase-locked loop to the frequency $f_2$ or $f_1$ of the signal $S_2$ or $S_1$. In the case presented in FIG. 8, the clock generator 10 is synchronized to the frequency $f_2$. The frequency $P \cdot f_2$ is divided by the number Q by means of a direct frequency divider 11. Via circuitry 12, the pulse center of the signal $S_3$ is related to the signals $S_1$ and $S_2$ according to the requirements presented in FIG. 1 or FIG. 4. Q and P are integral numbers, the quotient of which is in the following relation with the frequencies $f_1$ and $f_2$:

$$\frac{f_1 + f_2}{f_{1(2)}} = \frac{P}{Q}$$

The phase-locked loop consists of the clock generator 10, the direct frequency divider 13, the phase comparator 14 and the low-pass filter 15.

In the example shown in FIG. 1, the frequency ratio is $f_2/f_1 = \frac{2}{3}$, where $f_3 = f_1 - f_2$ and $f_3/f_2 = \frac{1}{2}$. Thus:

$$\frac{f_1 - f_2}{f_2} = \frac{P}{Q} = \frac{1}{2}$$

In order to achieve the required phase relation of the signal $S_3$ with the signal $S_2$, P=2 and Q=4 is selected in this case. The phase-locked loop in the circuitry for the frequency converter according to FIG. 9(a) consists of a voltage-controlled oscillator 16 with the output signal $S_P$, a frequency divider 17 which in this case divides the frequency of the oscillator 16 by P=2, an amplifier 18 with the output signal $S_2'$, a multiplier 19 and a low-pass filter 20. In stationary state, the two signals $S_2$ and $S_2'$ which have the same frequency are phase-shifted with respect to each other by $\frac{1}{4}$ cycle, i.e. 90°, as is shown in FIG. 10. The signal shapes for $S_1$, $S_2$ and $S_3$ correspond to those shown in FIG. 1.

The signal $S_3$ is obtained from $S_P$ by frequency division by the factor Q=4. Rising or falling edges of $S_3$ are generated at rising edges of $S_P$, as results from FIG. 10. In this case the choice of a specific pulse $S_P$ is determined on the basis of specific features of $S_1$ and $S_2$ coded for a preceding period of time.

Figure 9:
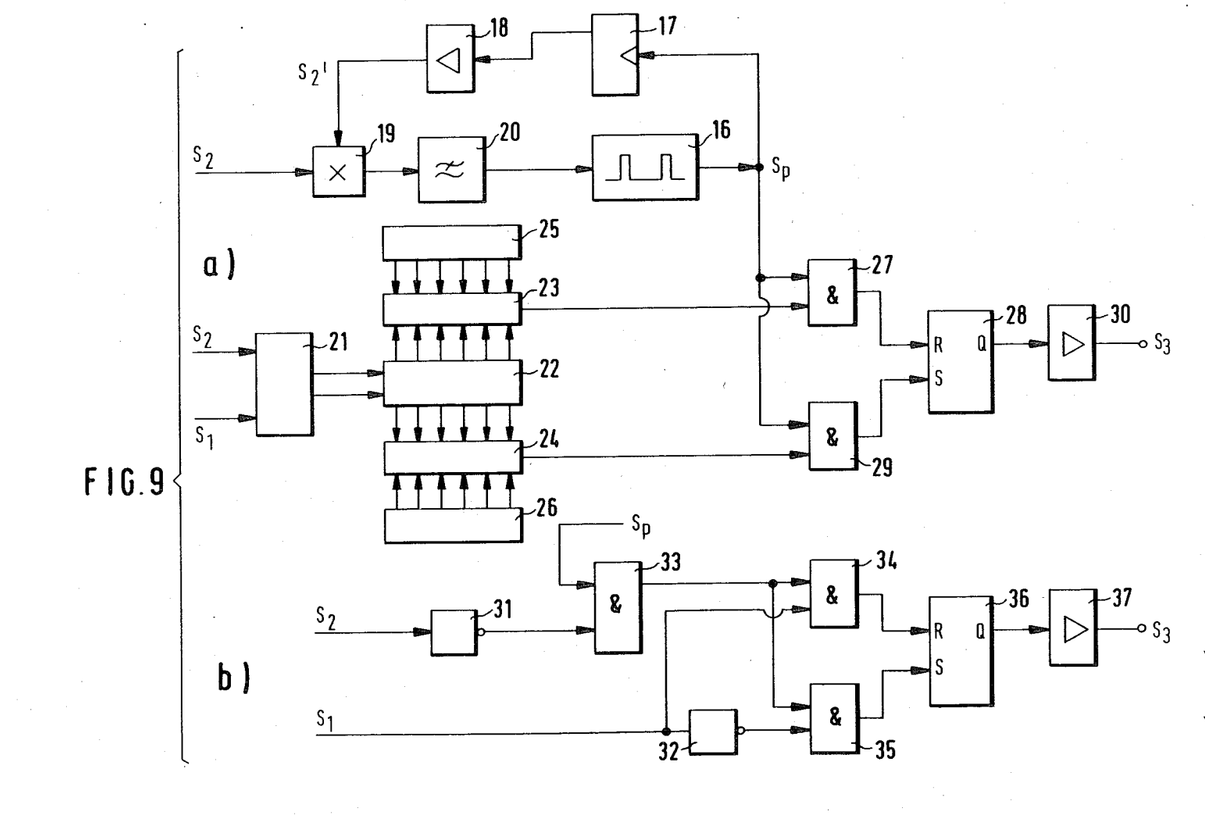
Figure 10:
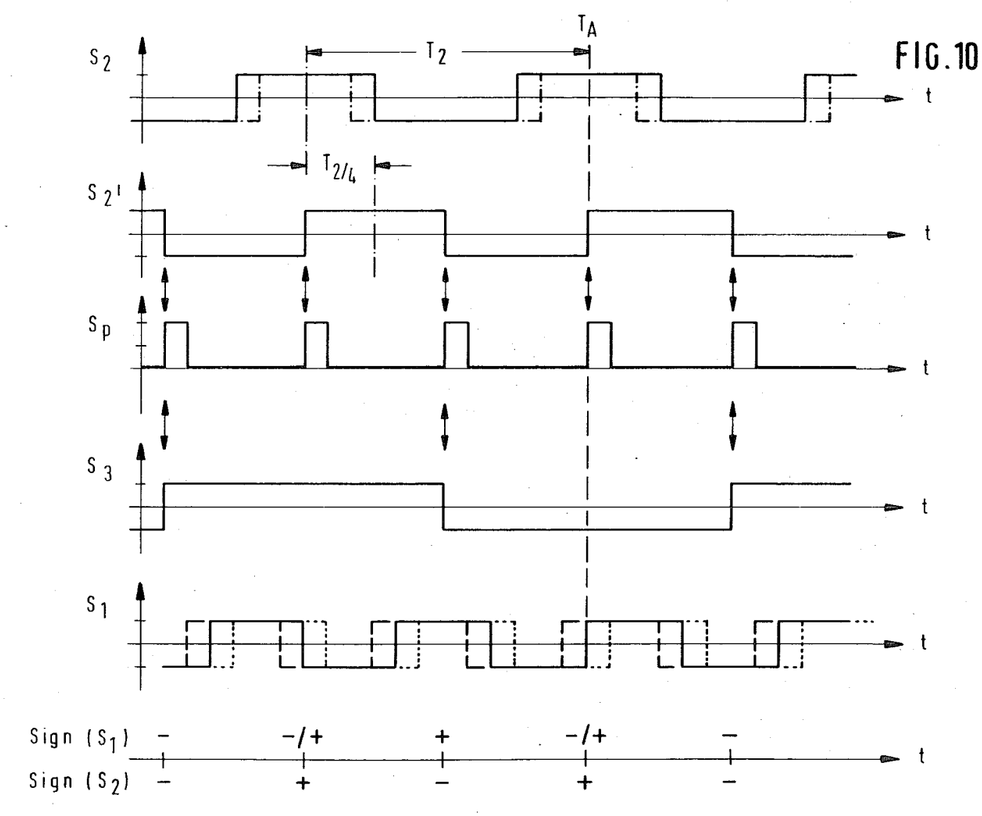
FIG. 10 shows the signal shapes in the circuitry according to FIG. 9.

At the output of the circuitry 21 in FIG. 9(a), which represents an edge detector, a logical signal is therefore generated with each edge of the signal $S_1$ or $S_2$ in such a way that the output of the circuitry 21 assumes the logical state HIGH if a rising edge of $S_1$ or $S_2$ occurs, or the logical state LOW if a falling edge of $S_1$ or $S_2$ occurs. After each edge of $S_1$ or $S_2$, this signal is fed into a shift register 22 by means of a clock signal generated by the circuitry 21, signals fed previously being shifted by one memory cell. In the case of FIG. 1, the shift register 22 consists of ten cells, according to the ten possible signal changes of $S_1$ and $S_2$ within a period T.

The parallel outputs of the shift register 22 are connected with two digital comparators 23 and 24, whose other inputs are connected with the outputs of two memories 25 and 26. In memories 25 and 26, the corresponding sequences of signal changes are stored in the form of a code, after whose occurrence the signal $S_3$ indicates a signal change controlled by $S_P$. In the present case, this is the sequence

HHLLHLHHLL for the rising edge of $S_3$ which is stored in the memory 26, and

LHHLLHHLLH for the falling edge of $S_3$ which is stored in memory 25.

As soon as the character string fed to the shift register 22 via the circuitry 21 is identical with that of memory 25 or 26, the output of the comparator 23 and 24 becomes HIGH up to the next signal edge of $S_1$ or $S_2$. If the state of output of the comparator 23 is HIGH, a pulse is fed from $S_P$ via the AND gate 27 to the R input of the R-S flip-flop 28. This pulse generates the falling signal edge of the signal S₃. If the state of the output of the comparator 24 is HIGH, a pulse is fed from $S_P$ via the AND gate 29 to the S-input of the R-S flip-flop 28 which generates the rising edge of S₃. The amplifier 30 generates the signal S₃ from the output signal of the R-S flip-flop 28.

Another possibility of generating the signal S₃ for the example presented in FIG. 1 is shown in FIG. 9(b). In this case, one inverter 31 and 32 each and one AND gate 33, 34 and 35 each are provided for each of the signal paths S₁ and S₂. Depending on the state of the signals S₁ and S₂, the AND gates 33, 34 and 35 feed or do not feed the signal $S_P$ generated by the phase-locked loop 16, 17, 18, 19 and 20 to the respective inputs of an R-S flip-flop 36.

FIGS. 1 and 10, respectively, show that the signal S₃ has a rising edge if the signal S₂ and the signal S₁ are both negative, and a falling edge if the signal S₂ is negative and the signal S₁ is positive. According to FIG. 9(b), pulses of $S_P$ can pass to the AND gates 34 and 35 via an inverter 31 and an AND gate 33 only if the signal S₂ is negative. In this case, the logical state HIGH occurs if a signal (S₁, S₂) is positive, while the state LOW occurs if a signal (S₁, S₂) is negative. Depending on the logical state of S₁, which is fed to the AND gate 34 and, via an inverter 32, to the AND gate 35, the pulses of $S_P$ are fed to the inputs of the R-S flip-flop 36 via the AND gate 34 if the signal S₁ is HIGH, or via the AND gate 35 if the signal S₁ is LOW. When the pulse $S_P$ reaches the S-input, the Q-output becomes HIGH; when it reaches the R-input, the Q-output takes on the LOW state. The amplifier 37 generates the a.c. signal S₃ from this logical signal. In the case of other frequency conditions and other conditions of phase relation as, e.g. in the example shown in FIG. 4, the design of the circuitry will have to be modified accordingly.

In the case of gear boxes, the relation of the signals with respect to each other that has been adjusted is retained even after disengagement or engagement of the gear, and thus also the phase relation of signal S₃.

The integrator 9 connected at the output of the multiplier 8 as in FIG. 7, can be implemented in different ways. It is possible, for example, to provide an up-down counter, in which the pulses generated by a clock generator are counted upward as long as the signal S₁.S₂.S₃ is positive and downward as long as the signal S₁.S₂.S₃ is negative. The value resulting after a period T at the output of the digital integrator is divided in a known manner by a quantity that is proportional to the period T, in order to obtain a value proportional to torque.

Preferably, however, a digital filter adapted to the present signal shape is used. In its simplest form, such a filer can be described by the relation $$Y_n = Y_{n-1}(1-a) + a X_n$$

where $X_n$ is the input value at the time $t_n$, and $Y_n$ the generated output value at the time $t_n$. In other words, X corresponds to the signal S₁.S₂.S₃ at the output of the multiplier 8 shown in FIG. 7, and Y corresponds to the value proportional to the torque that is obtained at the output of the filter. $a$ is a factor which determines the transient response of the filter.

Figure 11:
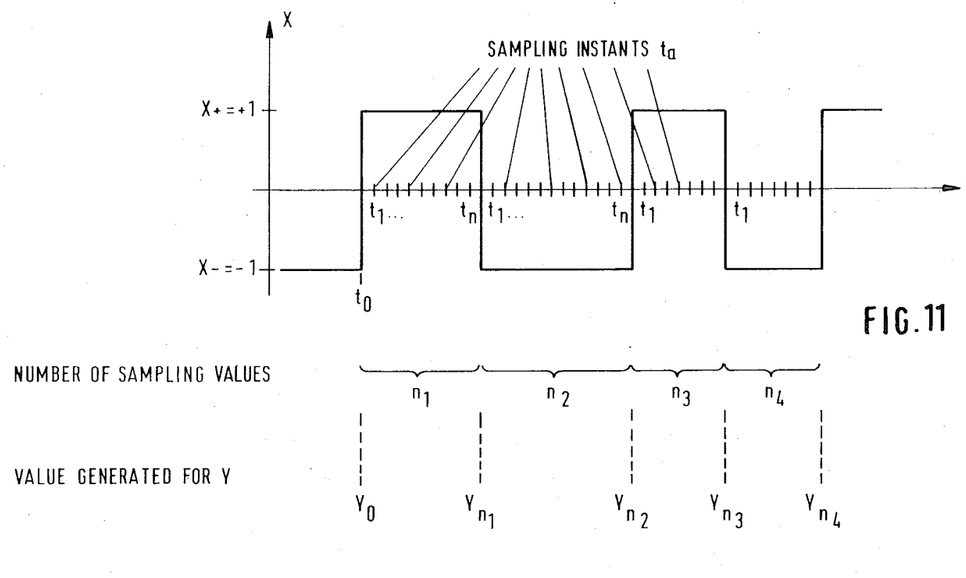
FIG. 11 shows the sampling times of the digital filter for the signal $S_1.S_2.S_3$.

In the present case, the input function is characterized by the fact that it assumes only specific values, e.g. $X_+ = 1$ and $X_- = 0$ or $X_+ = +1$ and $X_- = -1$, as is presented in FIG. 11. Then the following formula results for $Y_n$ at time $t_n$ $$Y_n = Y_0(1-a)^n + X_+ \cdot a \sum_{m=0}^{n-1} (1-a)^m$$

where $Y_o$ is the initial value of Y at the time $t_o = 0$.

When the number of sampling values equals $n_1$, $Y_{n1}$ is reached after $n_1$ values. Subsequently, a new cycle starts, in which $X = X_-$.

The term $$a \sum_{m=0}^{n-1} (1-a)^m$$

can be simplified by means of the formula that is applicable to power series $$\sum_0^n q^m = \frac{1 - q^{n+1}}{1 - q}$$

as follows:

$$a \cdot \sum_{m=0}^{n-1} (1-a)^m = 1 - (1-a)^n$$

The terms for Y can thus be converted into $$Y_{n1} = X_+ + (Y_o - X_+)(1-a)^{n1}$$

$$Y_{n2} = X_- + (Y_n - X_-)(1-a)^{n2}$$

etc.

Thus, it is necessary to calculate the output values of the filter only at the end of the respective cycle, which is characterized by the fact that X remains constant.

In the case of the shape of the signal S₁.S₂.S₃ presented in FIG. 1, twelve such values have to be determined within the least common period T, from each set of these twelve values the arithmetic mean being calculated, which is a highly accurate measure of torque.

Figure 12:
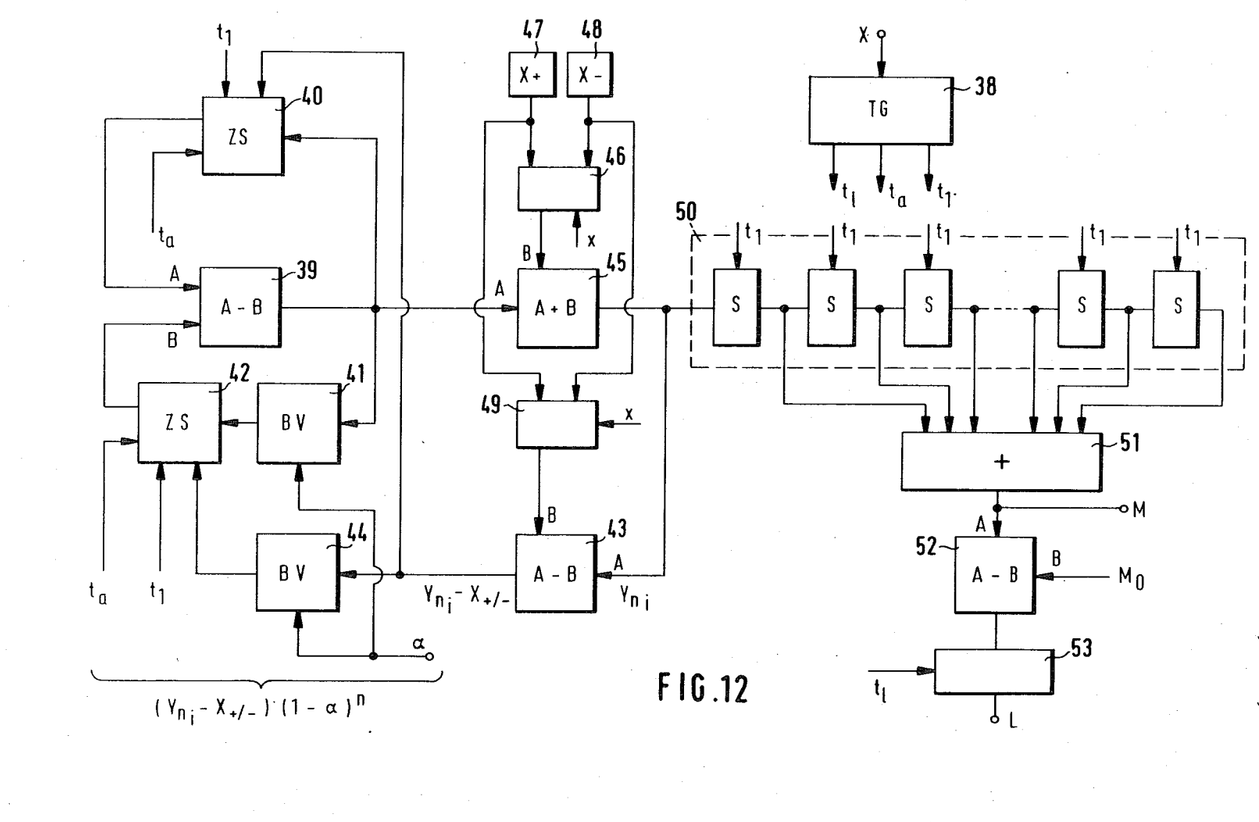
FIG. 12 shows an embodiment of the circuitry implementation for the digital filter.

FIG. 12 shows a possible circuitry for implementing the filter. The clock generator 38 generates a periodic scanning signal $t_a$ in such a way that a specific number of pulses occurs within the least common period T of the signal S₁.S₂.S₃ supplied by the multiplier. The number of sampling signals $t_a$, in combination with the factor $a$ determines the transient response of the filter and the accuracy with which the torque signal is approximated. Simultaneously with the first sampling signal within a cycle of X, i.e. when X changes from $X_-$ to $X_+$ or from $X_+$ to $X_-$, the sampling signal $t_1$ shown in FIG. 11 is generated. The pulse $t_1$ starts the system for determining $$(Y_{ni-1} - X_{+/-}) \cdot (1-a)^n$$

The factor $a$ is selected as a power of ½ so that, in case of binary representation of the torque signal, multiplication with $a$ can be effected by bit shifting by k bit. Multiplication of a binary number by $(1-a)$ can thus be effected by subtracting the value shifted by k bit from the original value. To this end, the output signal of the subtracter 39, is at each sampling pulse $t_a$ returned to the two inputs of subtracter 39, either directly via the buffer 40 or, shifted by k bit via the bit shifter 41 and the buffer 42, so that after each sampling pulse $t_a$ the previous value multiplied by $(1-\alpha)$ is available at the output of the subtracter 39. At the start of each cycle, i.e. at $t_1$, the value that is available at the output of the subtracter 43

$$(Y_{ni-1}-X_+) \text{ or } (Y_{ni-1}-X_-)$$

is input into the buffer 40 or after shifting by the bit shifter 44 by k bit into the buffer 42.

In adder 45, the value $X_+$ or $X_-$ is added to $$(Y_{ni-1}-X_+)(1-\alpha)^{ni}$$

or $$(Y_{ni-1}-X_-)(1-\alpha)^{ni}$$

Depending on the state of the signal X, the values for $X_+$ or $X_-$ are taken, via the switch 46, from the memory 47 or 48, and fed to the adder 45. Thus, the value $Y_{ni}$ is available at the output of 45 at the end of each cycle.

In the subtracter 43, the value $X_-$ or $X_+$ is subtracted from the value $Y_n$. Depending on the state of X, the corresponding value is taken from the memory 47 or 48 via the switch 49. Thus, the initial value of $(Y_{ni}-X_+)$ or $(Y_{ni}-X_-)$ is available at the output of subtracter 43 for the next cycle.

At the start of each new cycle, the output values of the adder 45 are read into the first memory cell of a shift register 50 which in this case has twelve cells, the previously input values thus being shifted forward by one memory cell. The output values of the individual memory cells are fed to an adder 51, at the output of which a value Y is available which is proportional to torque.

To determine the power, the value of no-load condition $M_o$ is subtracted from the values M in the subtracter 52, and the resultant values are added in an accumulator 53 for a specific period of time. The addition is started with the pulse $t_1$ of the clock generator 38 after each resetting of the accumulator 53. The power is proportional to the value reached in the accumulator 53 before the next resetting to zero.

Other circuitry configurations which effect the same mathematical algorithm are conceivable, e.g. by changing the sequence of 41 and 42 or combining 40 and 42.

Figure 13:
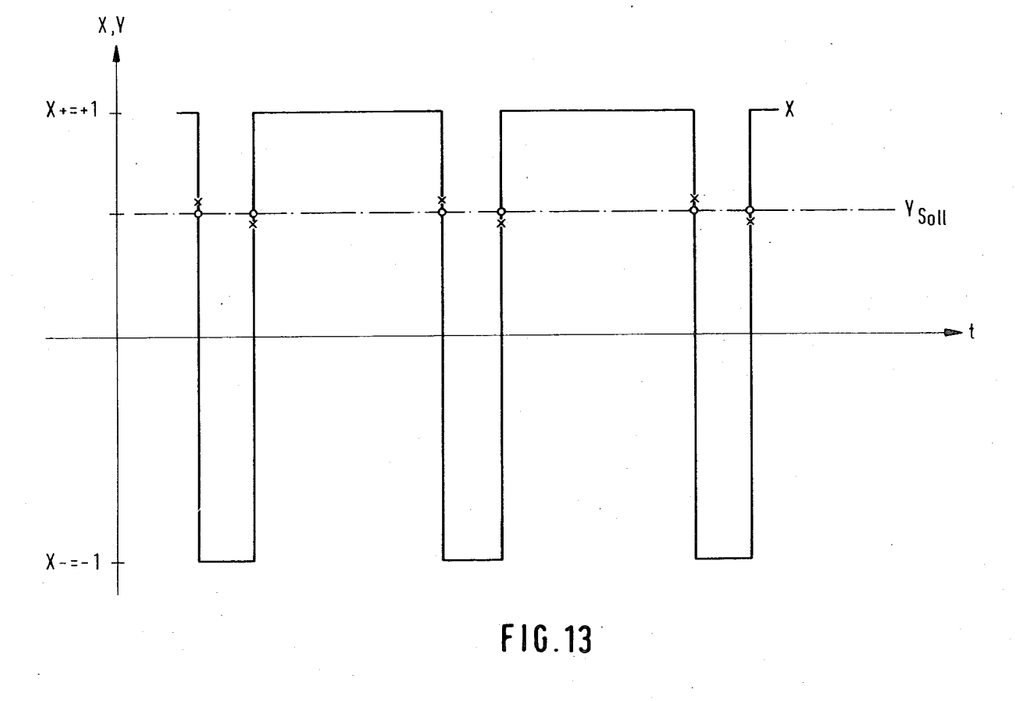
FIG. 13 shows the principle of the behavior of the digital filter.

FIG. 13 shows the curves for $Y_{n1}$ and Y for a specific shape of X. $Y_{soll}$ designates the nominal value of the signal that is proportional to torque. The values of $Y_{ni}$ which result after termination of each cycle are marked by crosses. They still differ from the nominal value by a certain amount. The values of Y at the output of the adder 51, which also result after termination of each cycle, are marked by circles. They differ only insignificantly from the nominal value.

The advantage of this filter over conventional digital low-pass filter is to be seen in the fact that conventional low-pass filters require implementation of a very high order to achieve the same filter characteristics; all multiplication stages that are necessary in conventional filters are emitted. As compared with digital integration, the division circuitry required for calculating the torque signal is not necessary.

We claim:

1. System for measuring the torque, the torsional vibrations and/or the power on at least one rotating shaft, comprising: providing a frequency converter (7) by means of which a new signal ($S_3$) can be generated from one of the frequencies ($f_1$ or $f_2$) of the signals ($S_1$ or $S_2$) of the sensors (2) received from emitters on or associated with said at least one rotating shaft, the frequency ($f_3$) of said new signal ($S_3$) corresponding to the sum or difference frequency of the frequencies ($f_1$, $f_2$) of the signals of the sensors (2) and said new signal being phase-locked to the signal ($S_1$ or $S_2$) from which it is generated, the relation between the initial phase of said new signal (3) and the frequency-generating signal ($S_1$ or $S_2$) of the sensors (2) being also determined by the other signal ($S_2$ or $S_1$); and feeding the signals ($S_1$, $S_2$) of the sensors (2) and the signal ($S_3$) of the frequency converter (7) to the multiplier (8); and calculating said torque, said torsional vibrations and/or power from the multiplied signals ($S_1$, $S_2$ and $S_3$) from said multiplier.

2. System as claimed in claim 1 wherein, in the case of systems of positive-locking shaft boxes, at least one emitter (1) is provided on one shaft.

3. System as claimed in claim 1, wherein, in gear boxes, at least one emitter (1) is provided on one shaft.

4. System as claimed in claim 1 or claim 2 or claim 3 wherein the frequency ($f_3$) of the signal ($S_3$) of the frequency converter (7) is generated from that of the signals ($S_1$ or $S_2$) of the sensors (2) which has the lower frequency ($f_1$ or $f_2$), and wherein the emitters (1) and the sensors (2) are arranged in such a way with respect to each other that, in no-load condition, a zero-axis crossing of the pulse train of a signal ($S_1$ or $S_2$) or the sensors (2) coincides with the pulse center of the signal ($S_3$) of the frequency converter (7) at a specific point of time, at least once within the least common period (T), the zero-axis crossing being that of the pulse train ($S_1$ or $S_2$) whose frequency (f1 or f2) is an even-numbered multiple of the fundamental frequency ($f_o$), said fundamental frequency ($f_o$) representing the reciprocal of the last common period (T).

5. System as claimed in claim 1 or claim 2 or claim 3 wherein the frequency ($f_3$) of the signal ($S_3$) of the frequency converter (7) is generated from that of the signals ($S_1$ or $S_2$) of the sensors (2) which has the higher frequency ($f_1$ or $f_2$), and wherein the emitters (1) and the sensors (2) are arranged in such a way with respect to each other that, in no-load condition, the zero-axis crossings of the pulse trains of all signals ($S_1$, $S_2$, $S_3$) coincide at a specific point of time at least once within the least common period (T).

6. System as claimed in claim 1 wherein an integrator (9) is connected at the output of the multiplier (8), said integrator being used to determine from the torsion dependent twist of the emitters (1) with respect to each other the measure of torque by integration of the signal ($S_1.S_2.S_3$) supplied by the multiplier (8) over one or several of the least common periods of the frequencies ($f_1$, $f_2$, $f_3$).

7. System as claimed in claim 1 wherein, in order to determine the power, a subtracter (52) is connected at the output of the adder (41), said subtracter subtracting the output value of the adder (51) in no-load condition from the actual output value, and wherein an accumulator (53) is provided in which the output values of the subtracter (52) are added for a specific period of time, the value reached at the end of the specific period of time being a measure of power.

8. System as claimed in claim 1 wherein a digital filter is connected at the output of the multiplier (8), said digital filter being suitable for generating a signal by time-discrete scanning from the pulse train of the signal ($S_1.S_2.S_3$) supplied by the multiplier (8) at each scanning value after each zero-axis crossing, said signal being a measure of the torsion-dependent twist of the emitters (1) with respect to each other.

9. System as claimed in claim 8 wherein, in order to achieve optimum transient response and optimum accuracy, the sampling rate of the clock generator (38) and the number of bit shifts in the bit shifters (41, 44) are adapted to each other.

10. System as claimed in claim 8 wherein a clock generator (38) is provided which continuously generates signals within the least common period (T) according to the sampling rate, and which generates a further signal at each edge of the pulse train of the signal ($S_1.S_2.S_3$), and wherein, in accordance with the sampling signal generated by the clock generator (38), the output signal of the subtracter (39) is returned on one path, via a bit shifter (41) and a buffer (42), to the other input of the subtracter (39), and wherein the actual signal value of the pulse train ($S_1.S_2.S_3$) and the signal of the subtracter (39) are fed to an adder (43), and that a further subtracter (43) is provided by means of which the respective other signal value of the pulse train ($S_1.S_2.S_3$), fed into one buffer (40) and via a bit shifter (44), into another buffer (42), instead of the output values of the subtracter (39), the signal that is available at the output of the adder (45) being a measure of torque.

11. System as claimed in claim 10 wherein the signal available at the output of the adder (45) is, at each edge of the pulse train ($S_1.S_2.S_3$), fed into a shift register (50), the number of memory cells corresponding to the number of edges of the pulse train ($S_1.S_2.S_3$) within the least common period (T) or within a multiple of said least common period (T), and wherein the signal values of the individual memory cells are added in an adder (51).

12. System as claimed in claim 1, wherein the frequency converter (7) is provided with a frequency divider (11) which divides the frequencies ($f_1$ or $f_2$) of the signals ($S_1$ or $S_2$) of the sensors (2) by an integer factor, and wherein a circuitry (12) is provided, by means of which the initial phase of the signal ($S_3$) of the frequency converter (7) is brought into the predetermined relation to the signals ($S_1$, $S_2$) of the sensors (2).

13. System as claimed in claim 12 wherein a clock generator (10) is connected at the input of the frequency divider (11) and, via a phase-locked loop (13, 14, 15), is synchronized, to the frequency ($f_1$ or $f_2$) of the signals ($S_1$ or $S_2$) of the sensors (2) or to a multiple of the said frequency ($f_1$ or $f_2$).

14. System as claimed in claim 12 wherein, in order to achieve the phase relation between the signals ($S_1$, $S_2$, $S_3$) which is required according to claim 3, one inverter (31, 32) and one AND gate (33, 34, 35) are provided in each of the signal paths ($S_1$, $S_2$) of the sensors (2), the signal generated by the phase-locked loop (16, 17, 18, 19, 20) being fed or not being fed by the AND gates (34, 35) to the respective inputs of an R-S flip-flop (36), depending on the state of the signals ($S_1$, $S_2$) of the sensors (2).

15. System as claimed in claim 12 wherein, in order to achieve the required phase relation between the signals ($S_1$, $S_2$, $S_3$), a code is stored in memories (25, 26), said code corresponding to the edge sequence of the signals ($S_1$, $S_2$) of the sensors (2) that is relevant to the required phase relation, and wherein an edge detector (21) for the signals ($S_1$, $S_2$) of the sensors (2) is provided, a shift register (22) being connected at the output of said edge detector, and wherein the codes filed in the memories (25, 26) are compared in comparators (23, 24) with the edge sequence of the signals ($S_1$, $S_2$) of the sensors (2) read into the shift register (22).

16. System as claimed in claim 15 wherein the output of the comparators (23, 24) are fed to AND gates (27, 29) which, in case of conformity of the input edge sequence with the stored code, forward the pulse generated from the phase-locked loop (16, 17, 18, 19, 20), the signal ($S_3$) being generated from these pulses via an R-S flip-flop (28).

* * * * *